(12) United States Patent
Cu-Unjieng et al.

(10) Patent No.: US 10,754,667 B1
(45) Date of Patent: Aug. 25, 2020

(54) SYSTEM AND METHOD OF MODULE ENGINEERING FOR AN INDUSTRIAL PROCESS

(71) Applicant: Yokogawa Electric Corporation, Tokyo (JP)

(72) Inventors: Mark Anthony De Castro Cu-Unjieng, Singapore (SG); Isao Hirooka, Singapore (SG); Hideki Murata, Singapore (SG); Naing Oo Lin, Singapore (SG); Archie Sambitan Orido, Singapore (SG); Takeshi Mori, Singapore (SG); Wilfred Woon Yew Teo, Singapore (SG); Ying Tzu Huang, Singapore (SG); Daisuke Yasunami, Singapore (SG)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 0 days.

(21) Appl. No.: 16/359,018

(22) Filed: Mar. 20, 2019

(51) Int. Cl.
*G06F 9/44* (2018.01)
*G06F 9/445* (2018.01)
*G05B 19/418* (2006.01)
*G06F 9/4401* (2018.01)
*G05B 19/042* (2006.01)

(52) U.S. Cl.
CPC ..... *G06F 9/44521* (2013.01); *G05B 19/0426* (2013.01); *G05B 19/41835* (2013.01); *G06F 9/4411* (2013.01); *G05B 2219/25428* (2013.01)

(58) Field of Classification Search
CPC .................................................. G06F 9/44521
See application file for complete search history.

(56) References Cited

U.S. PATENT DOCUMENTS

| 4,862,345 A * | 8/1989 | Lekron | G05B 15/02 700/83 |
| 8,655,857 B1 * | 2/2014 | Oscherov | G06F 9/4488 707/695 |

(Continued)

FOREIGN PATENT DOCUMENTS

EP     1 914 610 A2     4/2008

OTHER PUBLICATIONS

European Search Report issued in EP 20 15 1552.5 dated Jul. 3, 2020.

*Primary Examiner* — Hang Pan
(74) *Attorney, Agent, or Firm* — Sughrue Mion, PLLC

(57) ABSTRACT

An industrial plant module-based engineering system includes a group module library navigator that contains: a plurality of group class modules and a respective plurality of child class modules under an associated group class module of the plurality of group class modules. A group module instantiation engine is configured to instantiate the group class module with reflecting a hierarchy of the group class modules to generate, in an application structure navigator, a group application module (group APM) and a hierarchy of the group application module (group APM) from the group class module, and to instantiate the child class module to generate, in the application structure navigator, a child application module (child APM) from the child class module. The group module update engine is configured to update the allocation of each group class module and a respective topology of the complex loops of each group class module.

24 Claims, 7 Drawing Sheets

(56) References Cited

U.S. PATENT DOCUMENTS

2007/0192287 A1* 8/2007 Rothwein ............. G06F 9/4492
2013/0261773 A1* 10/2013 Resnick ................. G05B 15/02
                                                              700/86
2014/0129005 A1* 5/2014 Weatherhead ...... G06F 21/6227
                                                              700/86

* cited by examiner

SYSTEM AND METHOD OF MODULE ENGINEERING FOR AN INDUSTRIAL PROCESS

TECHNICAL FIELD

Embodiments of the present invention generally relate to a module-based engineering system and a module-based engineering method for automation design of an industrial plant.

BACKGROUND ART

[Overall of Module-Based Engineering]

In an industrial plant, a module-based engineering is useful for automation design by configuring and maintaining overall plant control systems, including plant instrumentation, safety instrumentation, and maintenance management. In general, servers of automation engineering systems centrally manage database of engineering data, which makes design information available for expanding, modifying, or maintaining the plant control system, and saves unnecessary manpower for fixing inconsistency between the design information and actual information stored in the plant control system. The module-based engineering refers to an engineering method to design control applications and alarms by transforming control logic and design information into modules and then combining the modules in the server of the automation engineering system. The modules, which may generally consist of independent software components such as customer information and know-hows gathered from the past design pattern experiences, may also include control logics, alarm attributes, and design information. Reuse of the modules configured in previous projects can improve engineering quality and reduce engineering time, which contributes to shorten the project period. FIG. 1 is a schematic diagram of a general concept of module-based engineering for automation design. As shown in FIG. 1, modules can be configured, registered to, and downloaded from the server of the automation engineering system by an engineering tool of the automation engineering system. The engineering design information is saved to create a summary document of the engineering results. In addition, the module-based engineering can be concurrently performed with the following engineering tasks: I/O design, control application design, and system configuration design.

In the module-based engineering, control logic, alarm attribute, design information, and attachments are treated as a module. The modules may generally include: design information; control logic; tuning parameters; alarm attributes; and attachments. Design information, such as functional specifications, may be defined as a module component. The design information may generally include texts, images, and tables that explain the details of the module. Control logic may include a control drawing and detailed definitions of functional blocks, switches, and messages. The control logic may be defined in a class module or an application module. Module-based engineering may allow tuning parameters to be treated as module components by bulk editing of tuning parameter design values in functional blocks defined in control logic of a field control system, and by comparing and setting tuning parameter design values and current values of a field control system. The field control system may be a hardware I/O Controller. Alarm attributes may be alarm setting values and alarm priorities. An arbitrary file can be attached as a module component. The list of attachments can be launched by a simple operation.

There are two types of modules available for module-based engineering, for example, a class module and an application module. The class module is used as a template for a control application, and the application module acts as an actual control application. The class module is a template. Based on the class module, an application module to perform an actual control application can be created. The application module maintains the relationship with the class module which is used as a template, and changes made to the class module are reflected to the application module. A single module is used as a template for multiple application modules. The application module performs a control application by assigning I/O and tag name to the application module. There are two types of application modules available, for example, a class-based application module created based on a class module, and a class-less application module created without using a class module.

The module-based engineering may allow designing of I/O, control applications, and system configuration in parallel, which enables to start designing control applications and I/O before finalizing the system configurations. Even after designing control applications, the I/O designs may be changed flexibly. Plant information contains various kinds of information for implementing control systems engineering. In the module-based engineering, I/O may be designed based on obtained I/O information of a plant. In general, engineering tools of the automation engineering system may be used for designing I/O to configure plant I/O information into a table-format I/O information list. The I/O information list defines information such as I/O tag names, I/O module types, and FCS station names where I/O modules are mounted, as well as the specific information of each I/O. The I/O information list can be exported and/or imported. The setting information of the I/O information list may be edited on an exported external file, and the setting information may be imported to the engineering tool of the automation engineering system. A class module is firstly created as needed. Then an application module is created using or not using the class module. The engineering tool of the automation engineering system is used for engineering of the control application design. An I/O tag name is given to an I/O terminal of the application module. An actual tag name is applied for the functional block of the application module. Since a control application is created based on the I/O tag name, the control application can be created prior to completion of the I/O design such as I/O module assignment information or specific information of each I/O.

Engineering of items other than designing I/O and control applications are done by designing system configuration such as field control stations (FCS) and human interface stations (HIS) as well as items common for the project and relevant to stations. These items are configured by a system view. The engineering tool of the automation engineering system is used for setting switches such as common switch, global switch, annunciator, signal event, operator guide messages, and printing messages. The engineering data of the I/O design and control application design created in the engineering tool of the automation engineering system independently of the system configuration are eventually assigned to a field control station (FCS) and generated as any project data. The engineering for process I/O, serial communication Ethernet communication completes when a project data is completed.

When module-based engineering is finished by completing the project data, the control applications test is conducted by using a predefined set of test functions. Functions to support module-based engineering include document generation function, bulk editing function, tuning parameter management function. The document generation function is to integrate design information of a module and various engineering data to generate a single document file. The tuning parameter management function is to manage the functional block tuning parameter values designed when creating control applications and current tuning parameter values of the field control systems. The bulk editing function is to collectively edit control logics and alarm attributes of the modules designed while configuring control applications.

SUMMARY

In some aspects, an industrial plant module-based engineering system includes a group module library navigator that contains: a plurality of group class modules and a respective plurality of child class modules under an associated group class module of the plurality of group class modules. A group module instantiation engine is configured to instantiate the group class module with reflecting a hierarchy of the group class module to generate, in an application structure navigator, a group application module (group APM) and a hierarchy of the group application module (group APM) from the group class module, and to instantiate the child class module to generate, in the application structure navigator, a child application module (child APM) from the child class module. The group module update engine is configured to update the allocation of each group class module and a respective topology of the complex loops of each group class module.

EMBODIMENTS

Figure 1:
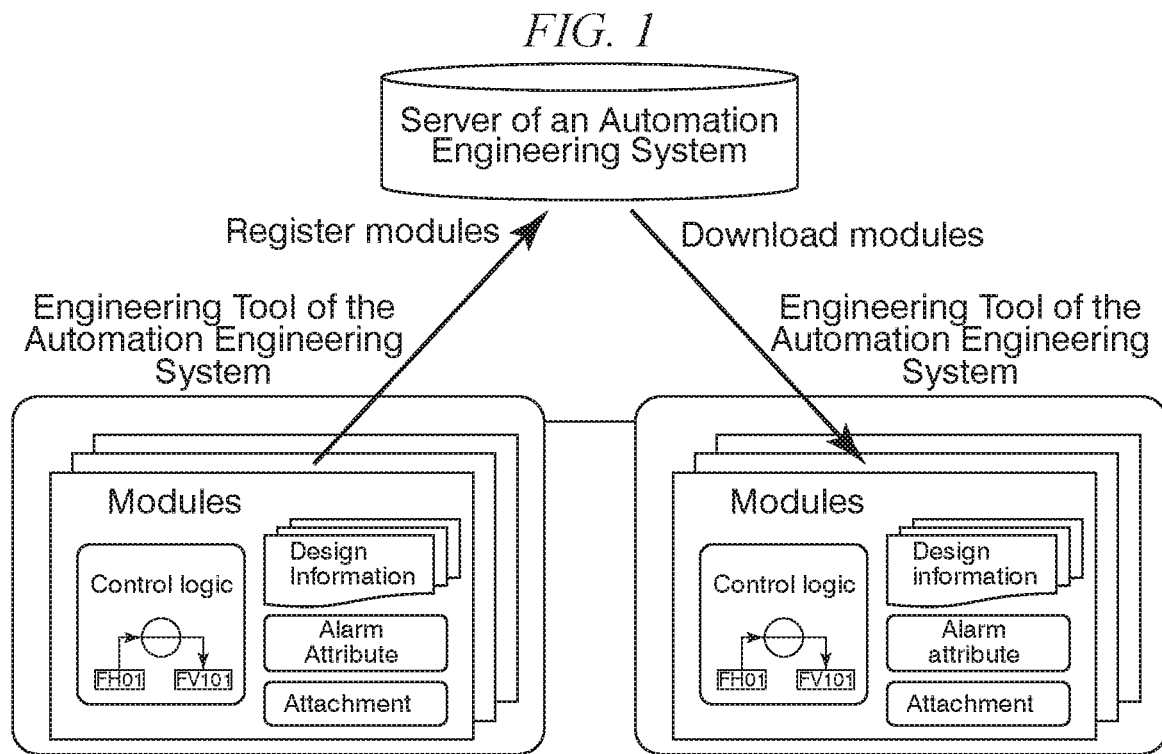
FIG. 1 is a schematic diagram of a general concept of module-based engineering for automation design.

In some embodiments, an industrial plant module-based engineering system may include, but is not limited to, a group module library navigator; a group module instantiation engine; a group module update engine; and a module binding engine. The group module library navigator contains: a plurality of group class modules and a respective plurality of child class modules which belong to an associated group class module of the plurality of group class modules. Each group class module includes at least one allocation which defines: groupings of a plurality of class modules; and assignments of the class modules to multiple drawings to define complex loops of multiple logical control module drawings. Each child class module includes a respective shortcut file which refers to an associated class module of the plurality of class modules. The plurality of child class modules defines and forms logic of the complex loops in the associated group class module. The group module instantiation engine is configured to instantiate the group class module with reflecting a hierarchy of the group class modules to generate, in an application structure navigator, a group application module (group APM) and a hierarchy of the group application module (group APM) from the group class module. The group module instantiation engine is configured to instantiate the child class module to generate, in the application structure navigator, a child application module (child APM) from the child class module. The group module update engine is configured to update the allocation of each group class module and a respective topology of the complex loops of each group class module. The group module update engine is configured to update an allocation of each group application module (group APM) and a respective topology of the complex loops of each group application module (group APM). The module binding engine is configured to bind, based on the at least one allocation of the group class module, the group application module (group APM) and a legacy application module (legacy APM) to drawings of field controllers in an industrial plant. The legacy application module is at least one of: a class-based application module which refers to a source class module: and a classless application module which does not refer to any source class module.

In some cases, each group class module may have a plurality of child class modules, folders, and a hierarchy of the child class modules and the folders.

In some cases, each group class module may include, but is not limited to, a design document information which is used to generate a document of module design; an attachment which is used to store artifacts related to the class module; and the allocation which defines groupings of class modules and assignments of the class modules to plural control drawings to define complex loops for drawings of field control systems.

In some cases, the industrial plant module-based engineering system may include, but is not limited to, a class module library navigator. The class module library navigator contains: a respective definition of a class module which includes re-usable module engineering data and documentations. The re-usable module engineering data include control logics, alarm parameters, and tuning parameters. The documentations include design information and attachments.

In some cases, the class module may include, but is not limited to, a design document information which is used to generate a document of module design; an attachment which is used to store artifacts related to the class module; a control logic that contains a logic information of process control; an alarm attribute; and turning parameters.

In some cases, the group module instantiation engine is configured to allow a user to select part of the child class modules to be not instantiated, to allow the user to generate a set of different group application modules from a single group class module.

In some cases, the module binding engine is configured to assign the multiple logical control drawings, which are defined in each group class module, to a respective one of a plurality of physical field control systems.

In some cases, the group module update engine is configured further to perform at least one of addition and deletion of the child application module (child APM) which refers to the group application module (group APM) that is instantiated from the group class module, in case that the group module update engine updates the respective topology of the complex loops of the group class module.

In some cases, the group module update engine is configured further to update contents of the child application module (child APM) which refers to the group application module (group APM) that is instantiated from the group class module, in case that the group module update engine updates the contents of the child application modules of the group application module (group APM).

In some cases, the group module update engine is configured further to perform at least one of addition and deletion of the child application module (child APM) which refers to the group application module (group APM) that is instantiated from the group class module, in case that the group module update engine updates the respective topology of the complex loops of each group application module (group APM).

In some cases, the group module update engine is configured further to update contents of the child application module (child APM) which refers to the group application module (group APM) that is instantiated from the group class module, in case that the group module update engine updates the respective topology of the complex loops of each group application module (group APM).

In some cases, each group application module (group APM) includes at least one allocation which defines: groupings of application modules; and assignments of the application modules to multiple control drawings to define complex loops of multiple logical control drawings.

In some cases, the group module update engine is configured to update the allocation of at least one of each group application module (group APM) and the respective topology of the complex loops of each group application module (group APM), if the group module update engine updated the allocation of each group application module and the respective topology of the complex loops of each group application module.

In some cases, the group module update engine is configured to update the allocation of at least one of each group application module (group APM) and the respective topology of the complex loops of each group application module (group APM), if changes or modifications are made to the allocation of each group class module and/or the respective topology of the complex loops of each group class module. The process for module-update, namely updating the allocation has been performed by the group module update engine, to reflect or synchronize the changes or the modifications to the each application module (group APM).

In some cases, the group module update engine is configured to delete the child application module which is instantiated from the child class module that has been deleted by the group module update engine.

In some cases, the group module update engine is configured to add an additional child class module, and the group module instantiation engine is configured to instantiate the additional child class module in case that the group module update engine added the additional child class module.

In some cases, the industrial plant module-based engineering system may further include, but is not limited to, an ungrouping editor. The ungrouping editor is configured to ungroup the group application module. The ungrouping editor is configured to change a top folder of the group application module into an application folder and to delete design information, attachment list and the allocation of the group APM, which are directly under the top folder, and also to change the child application modules, which refers to the group application module ungrouped, into the class-based application modules.

In some cases, the group module instantiation engine may include, but is not limited to, implementation to create an applicable instance of the group class module to allow for reusing the group class module as a template group module and allow for configuring editable parameters in the group class module instantiated.

In some cases, the group module update engine may include, but is not limited to, implementation to update the applicable instance of the group class module created by the group module instantiation engine to allow for reusing the group class module updated and allow for configuring editable parameters in the group class module updated.

In some cases, the allocation of the group application module (group APM) includes a subset from the allocation of the group class module from which the group application module (group APM) was instantiated.

In other embodiments, an industrial plant module-based engineering method may include, but is not limited to, preparing, in a group module library navigator, i-1) a plurality of group class modules; and i-2) a plurality of child class modules. Each child class module includes a respective shortcut file to an associated group class module of the plurality of group class modules to which each child class module refers, and wherein each shortcut file defines and forms logic of the complex loops in the associated group class module. The method may further include ii) instantiating the group class module with reflecting a hierarchy of the group class modules to generate, in an application structure navigator, a group application module (group APM) and a hierarchy of the group application module (group APM) from the group class module, to allow a user to reuse the group class module as a template group module and allow for configuring editable parameters in the group class module instantiated. The method may further include iii) instantiating the child class module to generate, in the application structure navigator, a child application module (child APM) from the child class module to allow for reusing the group class module instantiated and allow for configuring editable parameters in the group class module instantiated.

In some cases, the industrial plant module-based engineering method may further include, but is not limited to, iv) updating the allocation of each group class module and a respective topology of the complex loops of each group class module; and v) updating an allocation of each group application module (group APM) and a respective topology of the complex loops of each group application module (group APM).

In some cases, the industrial plant module-based engineering method may further include, but is not limited to, binding, based on the at least one allocation of the group class module, the group application module (group APM) and a legacy application module (legacy APM) to drawings of field controllers in an industrial plant. The legacy application module is at least one of: iv-1) a class-based application module which refers to a source class module: and iv-2) a classless application module which does not refer to any source class module.

Disclosures hereinafter describe two types of module-based engineering methods, one using normal class modules, and other using group class modules. The scope of the normal class module-based engineering covers the lowest level in hierarchy. For example, the scope of the normal class module-based engineering covers only regulatory simple loop of control module drawings but does not cover any complex loop of control module drawings, equipment module drawings and/or unit drawings. Grouping of the class modules for control module drawings in terms of characteristics and behaviour of a class-module-based object oriented to instantiate will expand the scope and allow that the scope of the group class module-based engineering covers not only the regulatory simple loop of control module drawings at the lowest hierarchy level but also the complex loop of drawings at higher hierarchy levels. The scope of the group class module-based engineering is wider than the scope of the normal class module-based engineering.

Instantiation is a process for creating a particular instance of a class.

Instantiation of a class is a process for generating an object.

An object is an instance of a class. An object is generated by instantiating a class.

A group application module (group APM) is an instance of a group class module.

A child application module (child APM) is an instance of a child class module which is a shortcut or reference to a class module.

A class is an extensible program-code-template for creating objects, providing initial values for state member variables and implementations of behavior. The class module is a reusable template. The class module contains engineering logic data, alarm attributes and tuning parameters to define its default sets of parameters and module rules to dynamically set values to parameters during instantiation. A class is also a template for containing sets of instructions and properties or references to other objects. Class module cannot refer to another class module unlike class which can contain references to another Class.

Instantiation of a class module is a process for generating a class-based application module.

A class-based module is the instance of the class module.

An object, which is generated by instantiating a class, is composed of a combination of variables, functions, and data structures, or a data type that is composed of a collection of names or keys and values.

A control loop is a group of components working together as a system to achieve and maintain the desired value of a system variable by manipulating the value of another variable in the control loop. Each control loop has at least an input and an output. There are two types of control loop, open loop and closed loop.

A group is a container for classes which creates or forms logical structure or topology in order to define relationships between class modules. But unlike class, a group module can be instantiated with partial structure while a class is instantiated always with the whole structure for its objects.

A group class module allows expanding the benefits of module engineering to enhance its reusability and convenience by grouping complex loops of multiple control drawings.

[Module-Based Engineering Using Normal Class Modules]

Figure 2:
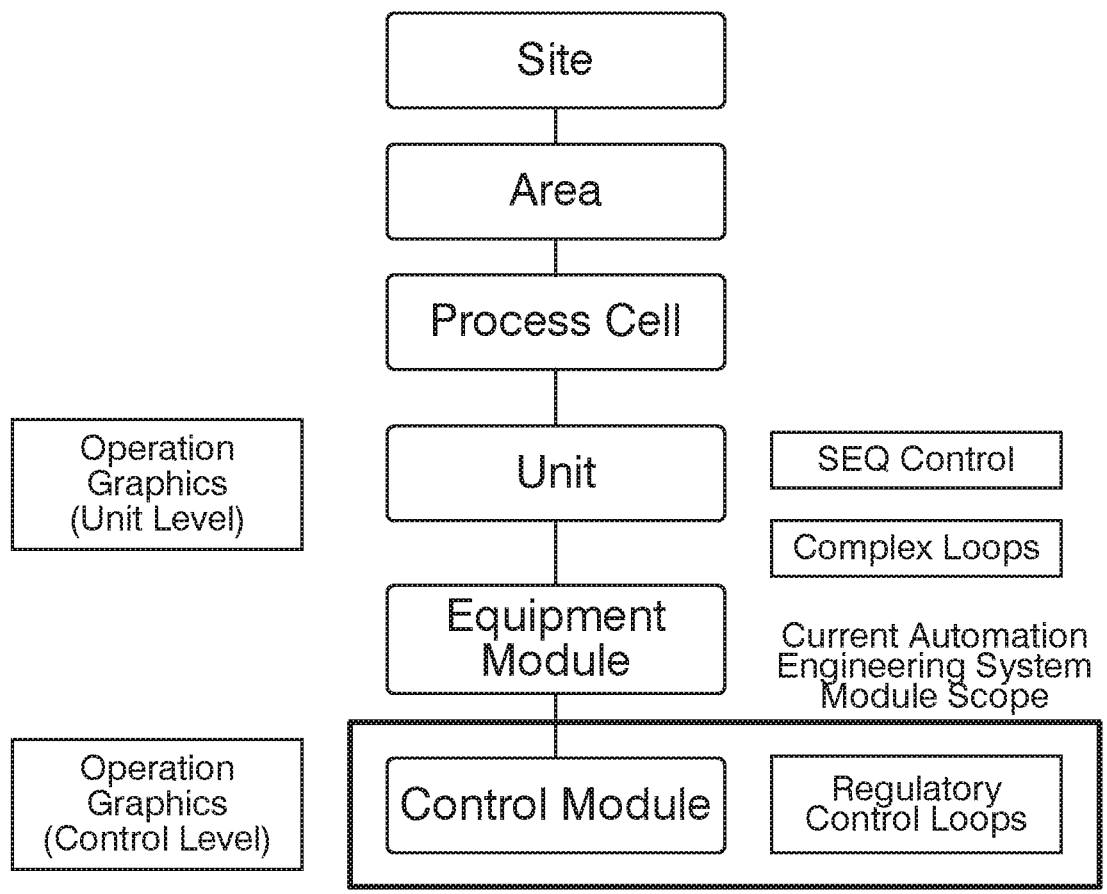
FIG. 2 is a block diagram illustrating a hierarchy of an industrial plant which refers to a variety of equipment in a plant control system that is organized into layered architectures based on a standard physical model such as a standard addressing batch process control.

FIG. 2 is a block diagram illustrating a hierarchy of an industrial plant which refers to a variety of equipment in a plant control system that is organized into layered architectures based on a standard physical model such as a standard addressing batch process control. The layered architectures are as shown in FIG. 2. In other words, FIG. 2 refers to plant hierarchy which refers to various equipment in the plant control system that are organized into layered architectures based on a particular physical model.

A site refers to a component of a batch manufacturing enterprise that is identified by physical, geographical, or logical segmentation within the enterprise. A site includes areas, process cells, units, equipment modules, and control modules.

An area refers to a component of a batch manufacturing site that is identified by physical, geographical, or logical segmentation within the site. An area may contain process cells, units, equipment modules, and control modules.

A process cell refers to a component of a batch manufacturing area that is identified by physical, geographical, or logical segmentation within the area. A process cell may contain units, equipment modules, and control modules. The process cell refers to a logical grouping of equipment includes the equipment required for production of one or more batches. The logical grouping defines the span of logical control of one set of process equipment within an area. This term logical grouping applies to both the physical equipment and the equipment entity.

A unit refers to a component of a batch manufacturing process cell that is identified by physical, geographical, or logical segmentation within the process cell. A unit may contain equipment modules, and control modules. The unit refers to a collection of associated control modules and/or equipment modules and other process equipment in which one or more major processing activities can be conducted. Units are presumed to operate on only one batch at a time. Units operate relatively independently of one another. The term unit applies to both the physical equipment and the equipment entity. Examples of major processing activities are react, crystallize, and make a solution.

An equipment entity refers to a collection of physical processing and control equipment and equipment control grouped together to perform a certain control function or set of control functions.

An equipment module refers to a component of a batch manufacturing unit that is identified by physical, geographical, or logical segmentation within the unit. An equipment module may contain control modules. The equipment module may also refer to a functional group of equipment that can carry out a finite number of specific minor processing activities. The equipment module may typically be centred around a piece of process equipment (a weigh tank, a process heater, a scrubber, etc.). The term equipment module applies to both the physical equipment and the equipment entity. Examples of minor process activities are dosing and weighing.

A control module refers to a component of a batch manufacturing equipment module that is identified by physical, geographical, or logical segmentation within the equipment module.

At the control module level, the application module has the simple regulatory control loops of control module drawings. At the higher levels such as the equipment module level and the unit level, the application modules have complex loops of drawings and sequence controls.

In some illustrative examples but not limited to, the site may be a factory, an area may be a department, a process cell may be a production line, a unit may be a unit, an equipment module may be equipment, and a control module may be a control loop.

For module-based engineering, class modules are reusable only at the control module level or the lowest level but not at higher levels such as the equipment module level and the unit module level. The scope of module engineering by using the normal class modules covers the lowest level or the control module level. The class module has a range of less than one drawing. In an industrial usage, a typical loop may have multiple drawings of control modules, equipment modules and/or unit. The scope of module engineering by using the normal class modules does not cover a complex loop of multiple drawings of control modules, equipment modules and/or unit, equipment module drawings and/or unit drawings.

Figure 3:
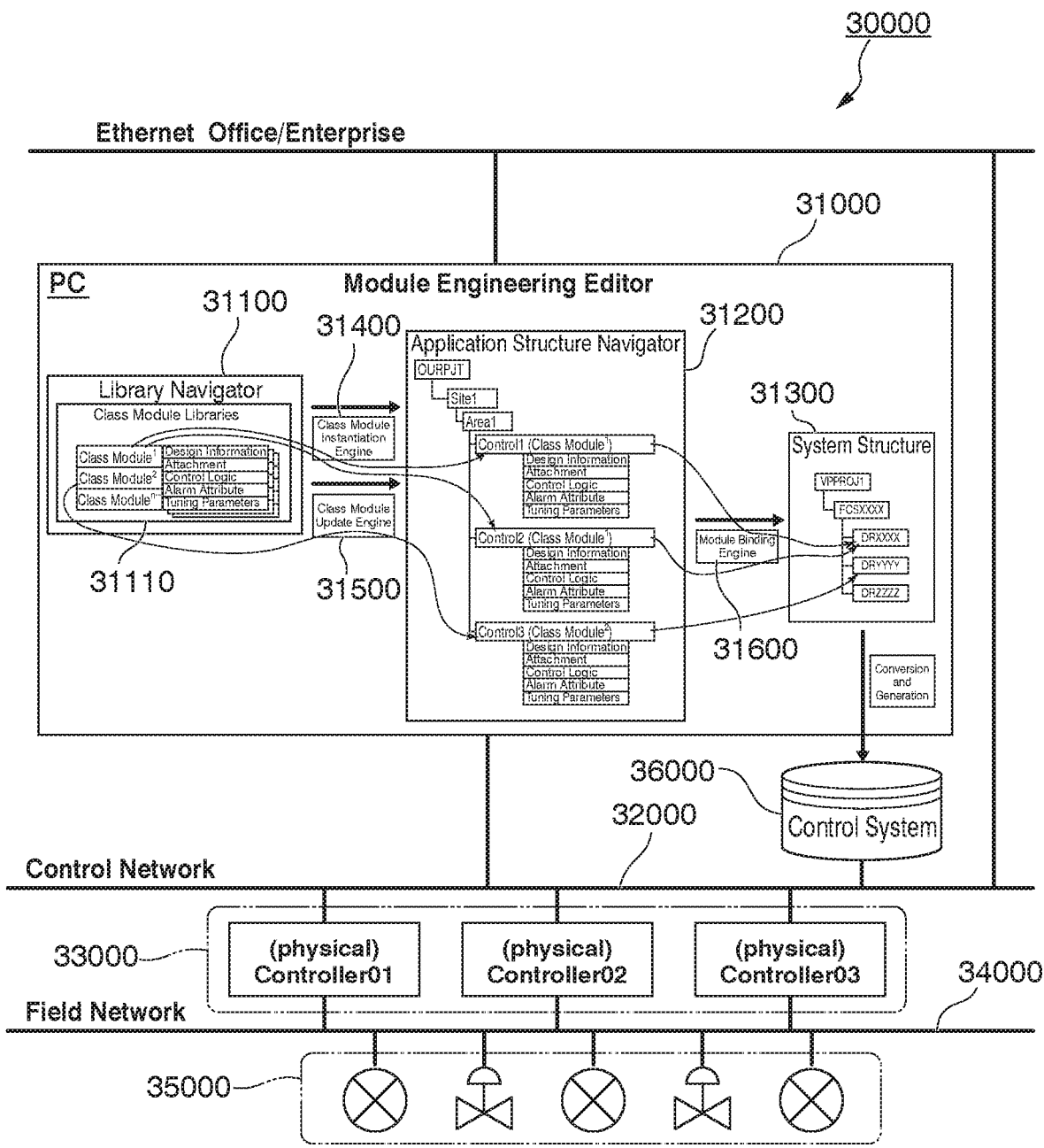
FIG. 3 is a block diagram illustrative of a plant engineering system which includes a normal module-based engineering system which uses normal class modules reusable at the control module level.

FIG. 3 is a block diagram illustrative of a plant engineering system which includes a normal module-based engineering system which uses normal class modules reusable at the control module level. The plant engineering system 30000 includes a module engineering system 31000, a control network 32000, a plurality of physical field controllers 33000, a field network 34000, a plurality of field devices 35000, and a control system 36000. The control system 36000 has a system engineering database 36100. The control system 36000 is connected via any available network such as Ethernet to the module engineering system 31000. The control system 36000 is connected via the control network 32000 to the plurality of physical field controllers 33000. The plurality of field devices 35000 is connected to the field network 34000 which is further connected to the plurality of physical field controllers 33000, so that the plurality of physical field controllers 33000 control the plurality of field devices 35000.

The module engineering system 30000 includes a module engineering editor 31000. The module engineering editor 31000 includes a library navigator 31100, an application structure navigator 31200, and a system structure 31300. The library navigator 31100 have class module libraries 31110 which include reusable class modules as engineering templates. Each class module includes design information, attachments, control logics, alarm attributes and turning parameters. The module engineering editor 31000 includes a class module instantiation engine 31400. The class module instantiation engine 31400 is configured to instantiate the class module 1 in the library navigator 31100 to generate application modules 1 and 2 which belong to the area 1 of site 1 in the application structure navigator 31200. The class module instantiation engine 31400 is configured to instantiate the class module 2 to generate an application module 3 which belongs to the area 1 of site 1. Instantiation is a process for creating a particular instance of a class. An object is an instance of a class. An object is generated by instantiating a class. Each of the application modules 1, 2 and 3 has the design information, the attachment, control logic, alarm attributes and turning parameters. The module engineering editor 31000 further includes a class module update engine 31500. The class module update engine 31500 is configured to update the application modules 1, 2 and 3. The module engineering editor 31000 includes a module binding engine 31600. The module binding engine 31600 is configured to bind the application modules 1 and 2, which have been instantiated by the class module instantiation engine 31400 from the class module 1 in the library navigator 31100, to a control drawing "DRXXXX" in the system structure 31300. The control drawing "DRXXXX" in the system structure 31300 is converted into engineering data and the engineering data is stored in the system engineering database 36100. As shown in FIG. 3, the application modules instantiated from the class module are individually bounded by the module binding engine 31600 to create the regulatory control loop of the control drawing without any complex loops of control module drawings, equipment module drawings and/or unit drawings.

The module engineering system 30000 is configured to reuse the class modules to create the control modules at the control module level in FIG. 2. The module engineering system 30000 is not configured to reuse the class modules to create the equipment modules or unit module modules at higher levels other than the control module level in FIG. 2, because the module engineering system 30000 is configured to use the normal class modules and to reflect regulatory control loops of control module drawings without any complex loops to the instances or application modules. At the higher levels such as the equipment module level and the unit level, the application modules have complex loops of control module drawings, and sequence controls.

[Module-Based Engineering Using Group Class Modules] (Expanded Scope of Module-Based Engineering)

One of the most significant functions of the group class module-based engineering for automation design of an industrial plant is improvement in reusability. Reuse of the already tested group class modules can improve engineering quality and reduce engineering time and testing time wherein the already tested group class modules are revised in part and reused in part.

Figure 4:
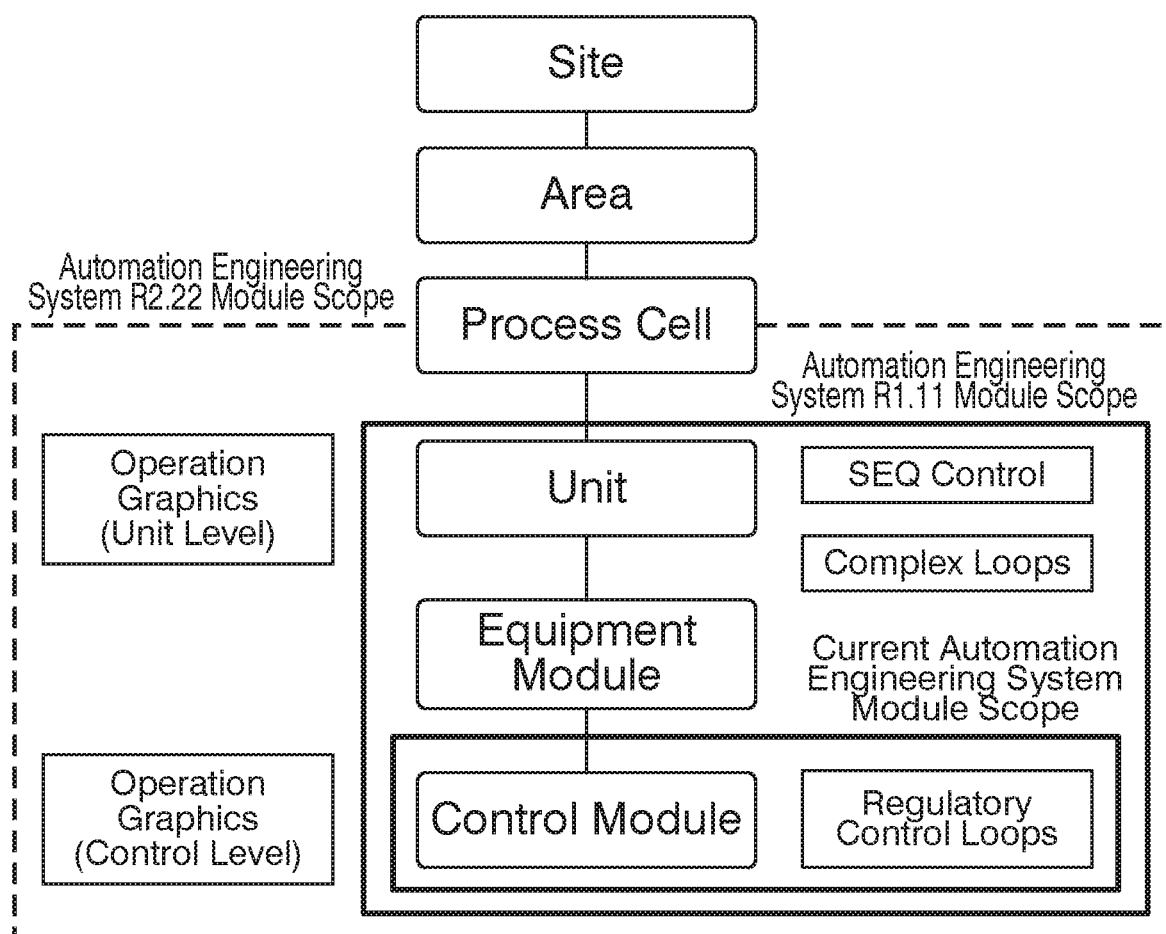
FIG. 4 is a block diagram illustrating a hierarchy of an industrial plant which refers to a variety of equipment in a plant control system that is organized into layered architectures based on group class module-based engineering.

The grouping of the class modules for drawings in terms of the characteristics and behaviour of a class-module-based object oriented to instantiate will expand the scope of the module-based engineering to complex loops of control module drawings, equipment module drawings and/or unit drawings. The value of the module-based engineering in terms of its reusability is greatly increased. The control module drawings with the complex loops can be exported and imported. The control module drawings with the complex loops can be instantiated and assigned to physical devices such as field control systems. FIG. 4 is a block diagram illustrating a hierarchy of an industrial plant which refers to a variety of equipment in a plant control system that is organized into layered architectures based on group class module-based engineering. For group module-based engineering, group class modules are reusable not only at the control module level or the lowest level but also at higher levels such as the equipment module level and the unit module level. The scope of group class module engineering by using the group class modules covers not only the lowest level or the control module level but also the equipment module level and the unit level. The group class module has a range of more than one drawing. In an industrial usage, a typical loop may have multiple drawings of control modules, equipment modules and/or unit. The scope of module engineering by using the group class modules covers a complex loop of multiple drawings of control modules, equipment modules and/or unit.

The group class module may flexibly be instantiated as a whole or partially which allows users to create not only a highly complex structure of drawings but also being flexible to instantiate a simpler structure of control module drawings. The instantiation of the group class module may be either top-down or bottom-up approach or simply extraction from any complex structure of control module drawings, equipment module drawings and/or unit drawings. The top-down approach may be, for example, but not limited to, module developments in the order of unit, equipment module, and control module. The bottom-up approach may be, for example, but not limited to, module developments in the order of control module, equipment module, and unit.

The group class module may be designed to adhere to some of characteristics and behaviour of a class-based object-oriented-like which is able to instantiate. Each group class module may contain one or more child class modules which are shortcuts or references to a class module in the same way that a class may contain or refer to another class as its property and/or field. The group class module is not applicable to all the characteristics of a class in object-oriented such as class inheritance. This means that it is not possible to inherit or basing the class module from another class module or group class module, polymorphism, etc.

Figure 5:
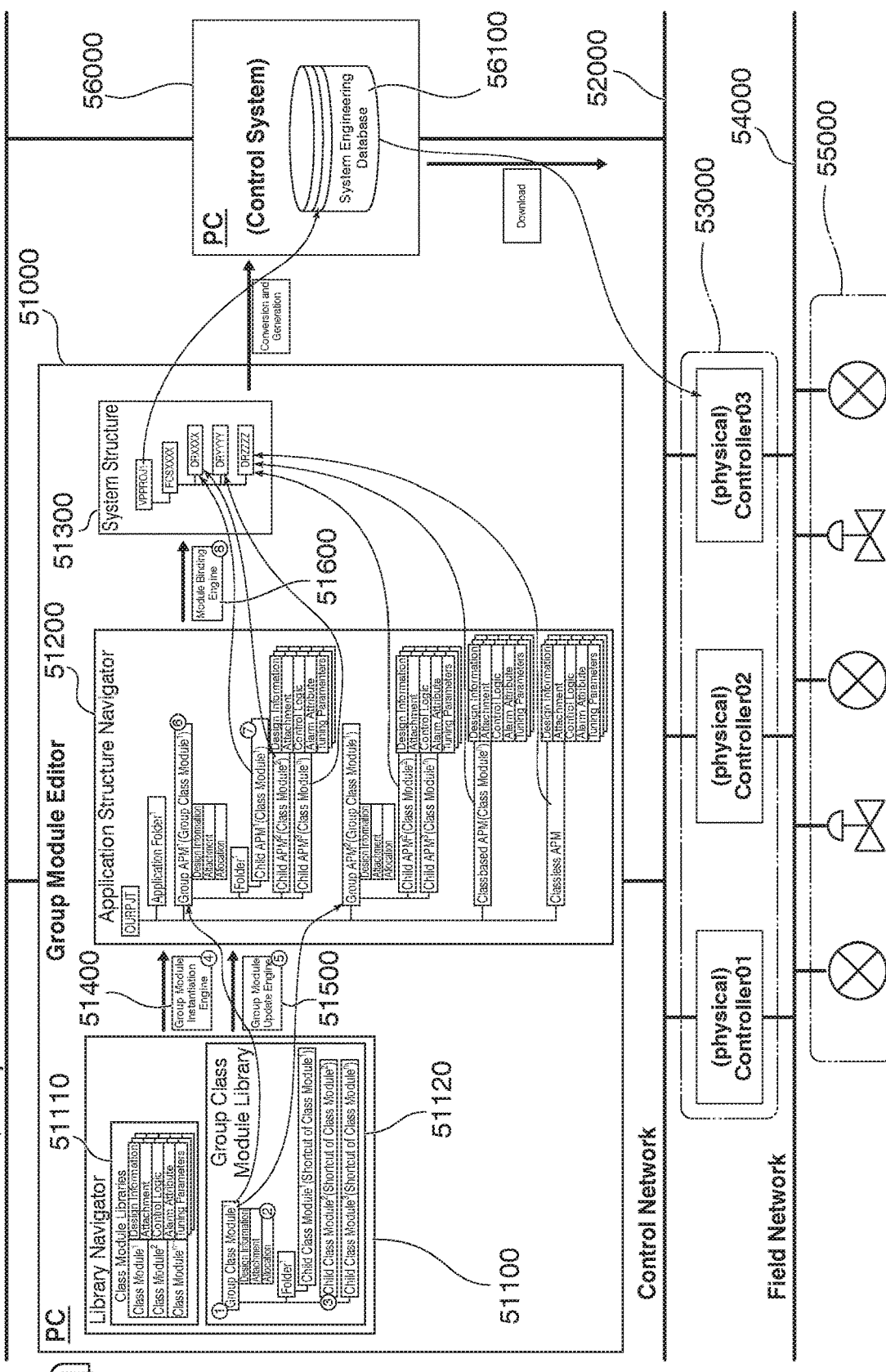
FIG. 5 is a block diagram illustrative of a plant engineering system which includes a group module-based engineering system which uses group class modules reusable at the control module level, equipment module level and/or unit level.

FIG. 5 is a block diagram illustrative of a plant engineering system which includes a group module-based engineering system which uses group class modules reusable at the control module level, equipment module level and/or unit level. The plant engineering system 50000 includes a group module engineering system 51000, a control network 52000, a plurality of physical field controllers 53000, a field network 54000, a plurality of field devices 55000, and a control system 56000. The control system 56000 has a system engineering database 56100. The control system 56000 is connected via any available network such as Ethernet to the group module engineering system 51000. The control system 56000 is connected via the control network 52000 to the plurality of physical field controllers 53000. The plurality of field devices 55000 is connected to the field network 54000 which is further connected to the plurality of physical field controllers 53000, so that the plurality of physical field controllers 53000 control the plurality of field devices 55000.

The group module engineering system 50000 includes a group module engineering editor 51000. The group module engineering editor 51000 includes a library navigator 51100, an application structure navigator 51200, a system structure 51300, a group module instantiation engine 51400, a group module update engine 51500, and a group module binding engine 51600. The library navigator 51100 have two different types of navigational libraries, for example, class module libraries 51110 and group class module libraries 51120. The class module libraries 51110 include reusable class modules as class-based engineering templates. Each class module includes design information, attachments, control logics, alarm attributes and turning parameters. The group class module libraries 51120 include reusable group class modules as group class-based engineering templates.

The hierarchy of the application structure navigator should be reflected to plant hierarchy of control system to allow for the expansion of the scopes of the module engineering.

The class module library 51110 contains definition of class module which contains the re-usable module engineering data (control logic, alarm parameters, and tuning parameter) and documentation (design information and attachment). Each class module is composed of 1) description information, 2) attachment, 3) control logic, 4) alarm attribute and 5) tuning parameters.

The group class module library 51120 contains definition of group class module which contains the groupings of class modules to form more complex loops which are bound to multiple control drawings.

Design information is used in document generation function where the design of the module may be published to a word document.

Attachment is used to store relevant artifacts related to the class module. Artifacts can be any binary files.

A control logic contains the logic information of process control. The contents of the control logic are to engineer the control drawing and function block detail definition.

The contents of alarm attributes are to engineer the alarm attributes of function block and the alarm attributes handled in an alarm system for operation stations (HIS).

The contents of tuning parameters are to engineer design values of control-related tuning parameters.

Each group class module composed of 1) design information, 2) attachment, and 3) allocation. Design information and attachments are similar function as in a class module, which are intended for documentations while the allocation defines the groupings of class modules and their assignments to multiple control drawings in order to define the complex loops.

Child class modules include shortcuts to class modules. Child class modules define and form the logic of complex loops in a group module.

Group class module can define its own topology to represent logical structure for a control and/or equipment module or unit.

(Group Module Libraries)

Each group class module has a complex structure. Each group class module includes design information, attachment and allocation. Each group class module may have one or more class folders. A class folder can be created under a group class module or another class folder in a group class module so that the class folder may include o one or more child class modules or one or more other class folders. Each group class module may also have one or more child class modules. FIG. 5 illustrates one example of the complex structure of the group class module. Herein, a class folder such as a folder 1 belongs to the group class module 1. The group class module 1 includes a plurality of child class modules 1, 2, - - - n which are associated to a plurality of class modules 1, 2, - - - n, respectively. In this example, the child class module 1 belongs to the class folder 1. The other remaining child class modules 2, 3, - - - n belong commonly to the group class module 1. One of the differences of the group class module from the normal class module is that the group class module includes the allocation and a plurality of child class modules which are associated to a plurality of class modules, respectively. The allocation for the group class module and the plurality of child class modules will expand the scope and allow that the scope of the group class module-based engineering covers not only the regulatory simple loop of control module drawings at the lowest hierarchy level but also the complex loop of drawings at higher hierarchy levels, for instance, equipment level and unit level.

First, user creates group class modules in the group class module libraries 51120. Then, user creates class folders and 'child class modules under the group class module. Child class modules are shortcut files to the legacy class modules.

The allocation in the group class module as the engineering template includes module grouping information for control module drawings. The allocation defines at least two: 1) groupings of class modules and 2) assignments of the class modules to multiple drawings of control modules, equipment modules and/or unit to define a complex loop structure of multiple logical drawings. There is another type of allocation for group application module, which will be described later. Described here is the allocation in the group class module as the engineering template for the complex loop structure of multiple logical drawings.

A respective plurality of child class modules belongs to an associated group class module of the plurality of group class modules. Each child class module includes a respective shortcut file which refers to an associated class module of the plurality of class modules. The respective plurality of child class modules, which belong to the associated group class module, define and form logic of the complex loops in the associated group class module.

The child class module belonging to the group class module as the engineering template includes a respective shortcut file which refers to a class module of the plurality of class modules in the class module libraries 51110. The class module to which the child class module refers is a legacy class module for the child class module. The group class module as the engineering template allows users to select instantiation or non-instantiation of each child class module. In other words, the group class module as the engineering template allows users to select one or more child class modules to be not instantiated, and the remaining child class module or modules to be instantiated. Modification to the legacy class module will reflect directly to all of one or more child class modules which refer to, and which is instantiated from, the legacy class module. This will leads to a certain enhancement of module maintainability. The legacy class module to which one or more child class modules refer are exportable and importable. The group class module is checked-out/in per entire group class module. Each child class module cannot be checked out/checked in independently. Each child class module can be deleted from the legacy class module. An additional child class module can be added to the legacy class module wherein the additional child class module has a shortcut file which refers to the legacy class module. The shortcut file of each child class module can refer to the legacy class module in the same way that a class can contain or refer to another class as its property and/or field. For the group class module-based engineering, the child class modules are necessary because a plurality of child class modules referring to the legacy class module define and form the logic of complex loops of a group class module.

The group class module can define its own topology to represent logical structure for control module drawings, equipment module drawings and/or unit drawings.

The design information, such as functional specifications, may be defined as a module component. The design information may generally include texts, images, and tables that explain the details of the module. The control logic may include a control drawing and detailed definitions of functional blocks, switches, and messages. The control logic may be defined in a class module or an application module. Module-based engineering may allow tuning parameters to be treated as module components by bulk editing of tuning parameter design values in functional blocks defined in control logic of a field control system, and by comparing and setting tuning parameter design values and current values of a field control system. The alarm attributes may be alarm setting values and alarm priorities. An arbitrary file can be attached as a module component. The list of attachments can be launched by a simple operation.

(Instantiation of Group Class Module)

As shown in FIG. 5, the module engineering editor 51000 includes the group module instantiation engine 51400. The group module instantiation engine 51400 creates the group application module (group APM) on the basis of user configuration of selected child class modules. It is possible that some of the child class modules are excluded from the derived group application module (group APM). This allows engineer or user to construct the module engineering data for a group module by phases.

The group module instantiation engine 51400 is configured to instantiate the group class module 1 and the child class modules 1, 2, - - - n in the group class module libraries 51120 to generate instances and child instances which belong to the instances, in the application structure navigator 51200. The instances created or instantiated by the group module instantiation engine 51400 from the group class module 1 include group application modules 1 and 2 (group APM 1, group APM 2) as the instances and an application folder 1. The application folder 1 belongs to the group application module 1 (group APM 1). Herein, as a result of partial instantiation, the group application module 2 (group APM2) is able to not including an application folder 1, as a class folder 1, which includes the child class module 1 in the group class module library 51120 has not been instantiated.

The group application modules 1 and 2 (group APM 1, group APM 2) belong to a certain project (PJT). The child instances created or instantiated by the group module instantiation engine 51400 from the child class modules 1, 2, - - - n in the group class module libraries 51120 include a first set of child application modules 1, 2, - - - n as well as a second set of child application modules 2, - - - n. The first set of child application modules 1, 2, - - - n belongs to the group application module 1 (group APM 1), wherein the child application module 1 belongs to the application folder 1 which belongs to the group application module 1 (group APM 1). The other child application modules 2, - - - n belongs directly to the group application module 1 (group APM 1). The first set of child application modules 1, 2, - - - n are associated with the class modules 1, 2, - - - n, respectively. The second set of child application modules 2, - - - n belongs directly to the group application module 2 (group APM 2). The second set of child application modules 2, - - - n are associated with the class modules 2, - - - n, respectively.

Each of the group application modules 1 and 2 (group APM 1, group APM 2) includes the design information, the attachment and the allocation. The allocation of the group application module 1 (group APM 1) may be just a subset from the allocation of the group class module. The allocation in each of the group application modules 1 and 2 (group APM 1, group APM 2) may include module grouping information for control module drawings, equipment module drawings and/or unit drawings. The allocation in each of the group application modules 1 and 2 (group APM 1, group APM 2) defines at least two: 1) groupings of group application modules 1 and 2 and assignments of the group application modules 1 and 2 to multiple drawings of control modules, equipment modules and/or unit to define a complex loop structure of multiple logical drawings.

Further, the group module instantiation engine 51400 is configured to instantiate the class modules 1, 2, - - - n in the class module libraries 51110 to generate class-based application modules 1, 2, - - - n which are associated with the class modules 1, 2, - - - n, respectively. After generating the class-based application module, the class-based application module can be updated by group module update engine 51500 so that the association between the class-based application module and the class module is broken and the class-based application module is made independent from the class module, resulting in that the class-based application module becomes a classless application module.

As shown in FIG. 5, each of the child application modules 1, 2, - - - n, the class-based application module n, and the classless application module includes design information; control logic; tuning parameters; alarm attributes; and attachments. Design information, such as functional specifications, may be defined as a module component. The design information may generally include texts, images, and tables that explain the details of the module. Control logic may include a control drawing and detailed definitions of functional blocks, switches, and messages. The control logic may be defined in a class module or an application module. Module-based engineering may allow tuning parameters can be treated as module components by bulk editing of tuning parameter design values in functional blocks defined in control logic of a field control system, and by comparing and setting tuning parameter design values and current values of a field control system. Alarm attributes may be alarm setting values and alarm priorities. An arbitrary file can be attached as a module component. The list of attachments can be launched by a simple operation.

The module engineering editor 51000 further includes a group module update engine 51500. The group module update engine 51500 is configured to update the group application modules 1 and 2 (group APM 1, group APM 2), and class-based application modules (class-based APMs). The module engineering editor 51000 includes a module binding engine 51600. The module binding engine 51600 is configured to bind child application modules 1 and 2 (child APM 1, child APM 2), which belong to the group application module 1 (group APM 1) to control drawing "DRXXXX", and also bind another instance, a child application module (child APM 3) to another control drawing "DRYYYY". Similarly, the module binding engine 51600 is configured to bind a child APM, i.e. child APM 2 of Group APM 2, class-based application module (class-based APM) and a classless application module (classless APM) to a still another control drawing "DRZZZZ". The control drawing "DRXXXX", "DRYYYY", and "DRZZZZ" in the system structure 51300 are converted into engineering data and the engineering data is stored in the system engineering database 56100. As shown in FIG. 5, the application modules instantiated from group class modules and class modules are bounded by the module binding engine 51600 to multiple control drawings and to define complex loops of control module drawings, equipment module drawings and/or unit drawings. As a result of expanding the engineering scope to equipment module and/or unit level, the engineering efficiency for industrial controls has been significantly improved.

As described above, the hierarchy of the group class module and the child class modules in the group class module libraries 51120 will be reflected to the application structure navigator 51200 during the instantiation of the group class module and the child class modules in the group class module libraries 51120 by the group module instantiation engine 51400. User configures grouping of class modules in the module libraries 51110 to generate group class modules in the group class module libraries 51120. The reason why user configures grouping of class modules is that this grouping is to be used in later process, module binding after instantiation. After user configured grouping of class modules and generated the group class modules in the group class module libraries 51120, user performs the instantiation so that group application modules (group APMs) and their hierarchy will be created at a location which the user specifies in the application structure navigator 51200. The instance that is instantiated from the group class module is called as group application module (group APM). The instance that is instantiated from the child class module is called as child application module (child APM). When performing the instantiation, user can select one or more child class modules which are not to be instantiated or, in other words, select child class modules to be instantiated. User can instantiate the same group class module with different selections of one or more child application modules (child APMs). This partial instantiation may, for example, generate a first group application module with a first set of one or more child application modules (child APMs) and a second group application module with a second set of one or more child application modules (child APMs), wherein the first set of one or more child application modules (child APMs) are different from the second set of one or more child application modules (child APMs). The group module instantiation engine 51400 is configured to create group application modules (group APMs) on the basis of user configuration of selected child class modules. It is possible that some of the child class modules are excluded from the derived group application modules (group APMs). This allows engineer or user to construct the module engineering data for a group module by phases. The module engineering editor 51000 contains implementations to create applicable instance of group class modules to allow users to reuse the template group class module.

The design information is not copied or inherited by the group application module (group APM). The design information may have its own documentation to explain its real-world or concrete usage, design, and purpose. The attachment is not copied or inherited by the group application module (group APM). The attachment may have its own documentation to explain its real-world or concrete usage, design, and purpose. The allocation of group application module (group APM) may be just a subset from the allocation of group class module, depending on which child class module is instantiated.

User selects which child class modules to include in instantiation of group class module.

Respective child application modules (child APMs) 1, 2 and 3 usually have 1) design information, 2) attachment, 3) control logic, 4) alarm attribute and 5) tuning parameters.

There is a difference between the design information in the child application module 1 (child APM1) in the application structure navigator 51200 and design information in class module 1 in class module libraries 51110.

There is a difference between the attachment in the child application module 1 (child APM1) in the application structure navigator 51200 and attachment in class module 1 in class module libraries 51110.

In some editable fields, there is a difference between the control logic in the child application module 1 (child APM1) in the application structure navigator 51200 and control logic in class module 1 in class module libraries 51110.

In some editable fields, there is a difference between the alarm attributes in the child application module 1 (child APM1) in the application structure navigator 51200 and alarm attributes in class module 1 in class module libraries 51110.

In some editable fields, there is a difference between the tuning parameters in the child application module 1 (child APM1) in the application structure navigator 51200 and tuning parameters in class module 1 in class module libraries 51110.

The group application module 1 (group APM1) and group application module 2 (group APM2) are created from the group class module 1 in order to reuse the module engineering data in terms of topology, and contents by simply instantiating from a source Group Class Module and further in order to minimize engineering effort. Some editable parameters will still have to be configured. Class-based application module (Class-based APM) has a source class module and a classless application module (classless APM) does not refer to any source class module.

Figure 6:
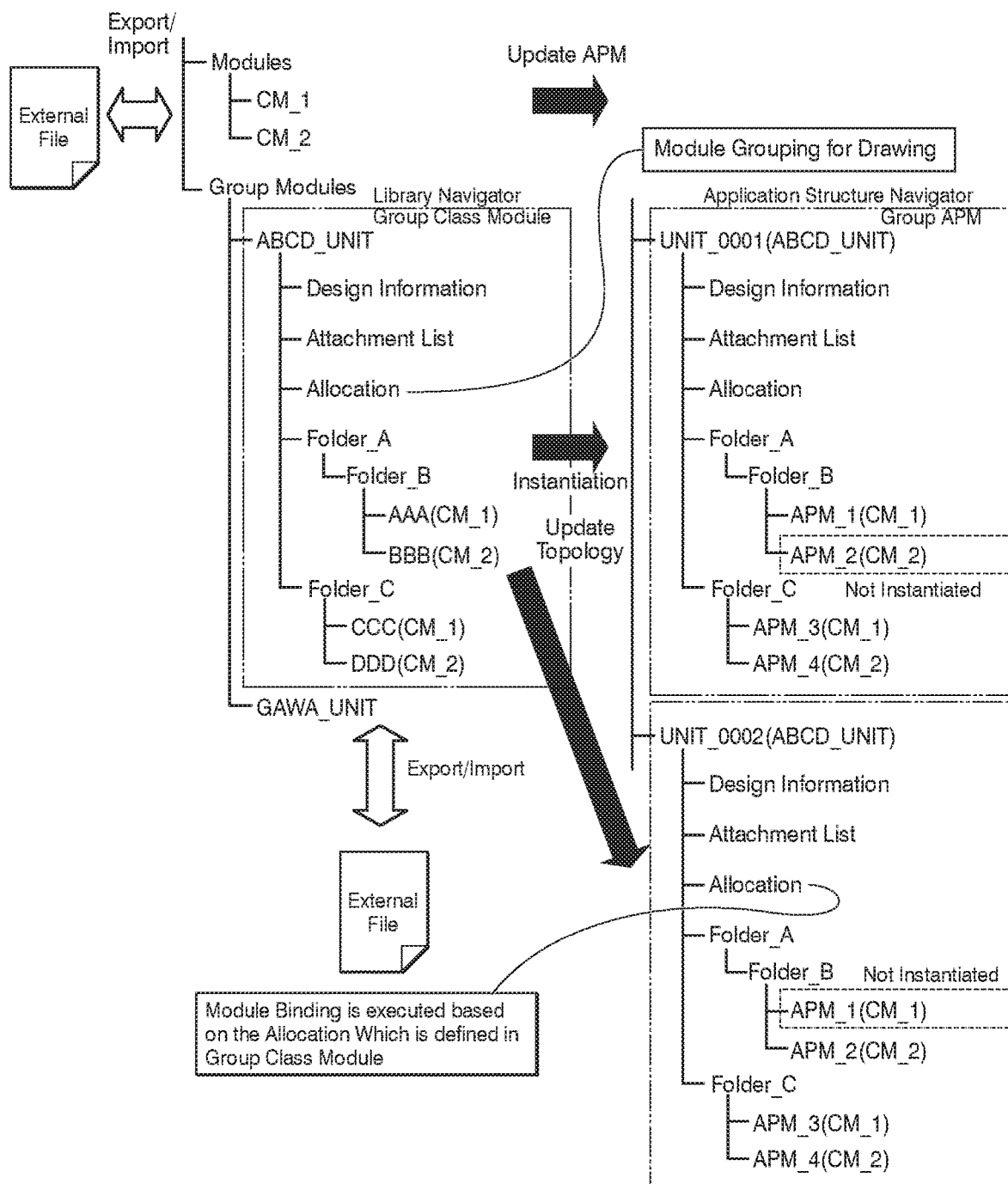
FIG. 6 shows an example of a group class module and two group application modules that have been partially instantiated from the group class module.

FIG. 6 shows an example of a group class module and two group application modules that have been partially instantiated from the group class module. Allocation defines the groupings of class modules and their assignments to multiple control drawings in order to define the complex loops. As way of example, group class module "ABCD_UNIT" in the library has been instantiated as group APM "UNIT_0001 (ABCD_UNIT)" or group APM "UNIT_0002 (ABCD_UNIT)". Users could select a child class module under a group class module not to be instantiated according to design needs and/or design phases for performing partial instantiation. For instance, as shown in FIG. 6, child class module "BBB (CM_2)" of group class module "ABCD_UNIT" has not been instantiated in group APM "UNIT_0001 (ABCD_UNIT)".

Finally, the logical control drawings, which were configured in the group class module, will be assigned to control drawings of physical field control systems 33000. In some cases, group application modules (group APMs) under the same group class module should be assigned to the same physical field control system 33000. When a legacy class module is referred from multiple child class modules, modifications for the legacy class module are reflected directly to multiple child class modules, which leads to enhanced module-maintainability.

(Binding Group Application Modules for Control Drawings)

As shown in FIG. 5, the module engineering editor 51000 includes the module binding engine 51600. The module binding engine 51600 is configured to bind child application modules 1 and 2 (child APM 1, child APM 2), which belong to the group application module 1 (group APM 1) to control drawing "DRXXXX", and also bind another instance, a child application module (child APM 3) to another control drawing "DRYYYY". Similarly, the module binding engine 51600 is configured to bind a class-based application module (class-based APM) and a classless application module (classless APM) both to a still another control drawing "DRZZZZ". The function of the module binding engine 51600 is to maintain relationships among the child application modules (child APMs). Legacy application modules (legacy APMs) can be independently bound to any drawing and there are no groupings or restrictions applied to the legacy application modules (legacy APMs). In the group application modules (group APMs), the allocation information will pre-assign groupings to the child application modules (child APMs) to enforce the child application modules (child APMs) to be assigned to the same control drawings.

(Update of Group Class Module After Instantiation)

The group module update engine 51500 is used to synchronize the changes of topology and allocation data from group class module to its applicable instance of the group application module (group APM). The group module update engine 51500 is configured to update topologies in loop structure of the group application modules 1 and 2 and topologies of one or more target group application modules 1 and/or 2 for synchronizing or reflecting the update of the topologies of the group application modules 1 and 2 to the topologies of the one or more target group application modules 1 and/or 2. The group module update engine 51500 is configured to update the allocation of each group class module and a respective topology of the complex loops of each group class module 1 in the group class module libraries 51120. The group module update engine 51500 is configured to update an allocation of a target group application module 1 or 2 (target group APM 1 or group APM 2) and a respective topology of the complex loops of the target group application module 1 or 2 (target group APM 1 or group APM 2). The group module update engine 51500 is configured to identify, or to allow user to identify, which group application module and its topology in loop structure must be reflected to a target group application module (target group APM). In other words, the group module update engine 51500 is used to reflect the change or modification by update of the topology in loop structure of the group class module to the topology in loop structure of the target group application module (target group APM).

As described above, each group class module has a complex loop structure. Complex update managements are necessary for the group class modules. As described above, each group class module has design information, attachment list and allocation. As also described above, each group application module (group APM) has design information, attachment list, and allocation. The design information and the attachments are separate definitions, and are not updated during instantiation or module update. The term "update" refers a process for change, modification, addition and deletion. The process for reflecting the change or modification by update of the topology in loop structure of the group class module to the topology in loop structure of the target group application module (target group APM) may include three steps: 1) updating the topology in loop structure of the target group application module (target group APM), 2) adding or deleting one or more child application modules to or from the target group application module (target group APM) to which the one or more child application modules belong; and 3) updating contents of the one or more child application modules.

The group module update engine 51500 is configured to perform the update between topologies of the group class module and group application module (group APM) on the basis of the existence of child application module (child APM) in the group application module (group APM) and the changes to the location of the source child class modules. The group module update engine 51500 contains implementations to update the previously created applicable instance of group class modules with its newer versions.

More detailed descriptions for update of group class module after instantiation will be described in terms of reusability, check-out/in, contents, update, and ungroup.

Figure 7:
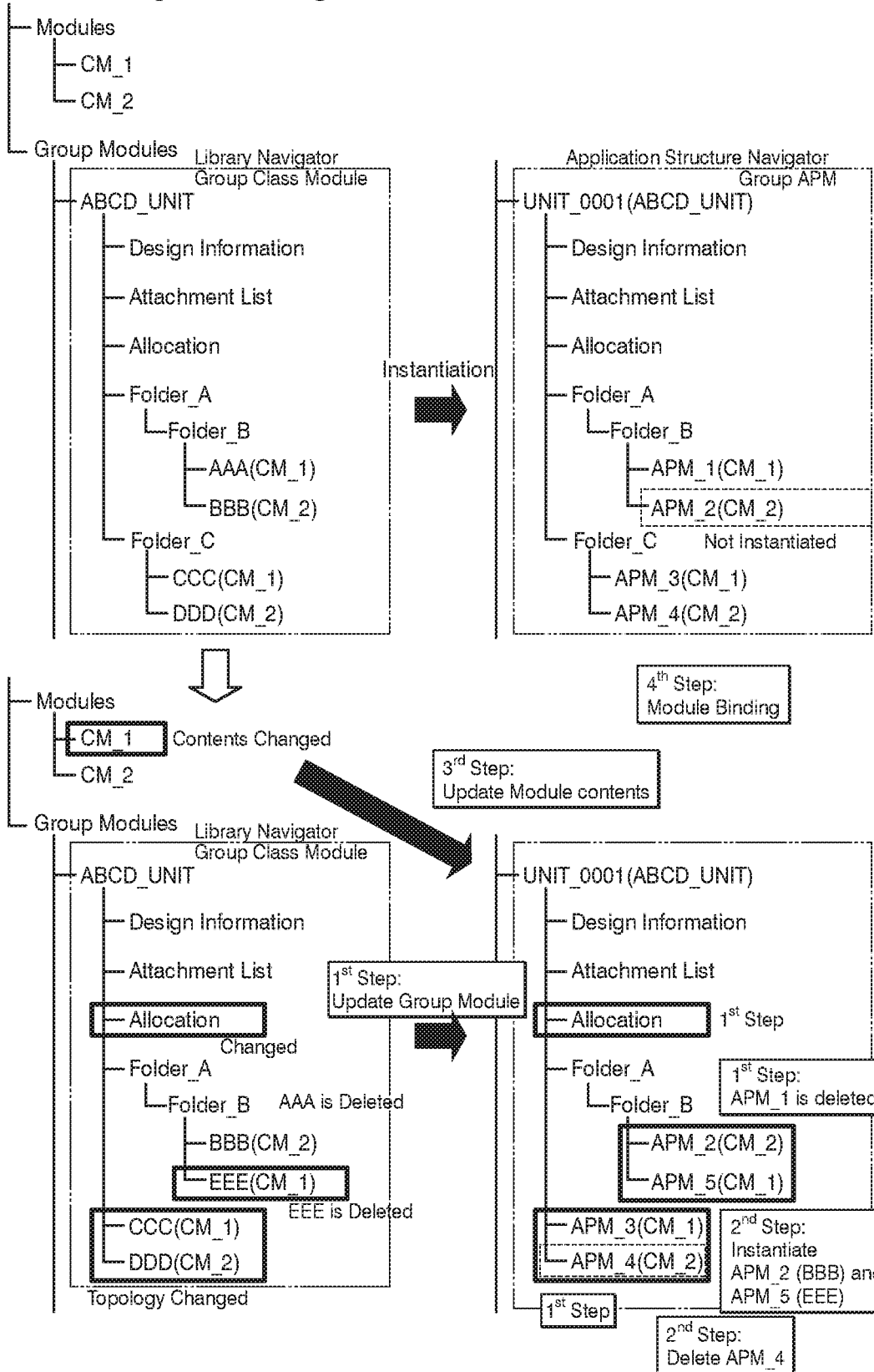
FIG. 7 shows an example of update management for group class modules and group application modules.

FIG. 7 shows an example of update management for group class modules and group application modules. After instantiation, if child class module "AAA (CM_1)" is deleted under Folder B of group class module "ABCD_UNIT", then the instance "APM_1 (CM_1)" of the child class module "AAA (CM_1)" will be deleted from the corresponding group APM under the application structure navigator, when module update has been triggered and/or performed. If the child class module "EEE (CM_1)" is added under group class module, it will be instantiated using a separate Instance Window Dialogue and being instantiated as "APM_5 (CM_1)". Engineer or user could delete class APM under the application structure navigator, for example, deleting "APM_4 (CM_2)", but its source class module will not be deleted by this deletion, which is "DDD (CM_2)".

Reusability:

The group class module can be exported and/or imported in two steps. Firstly, legacy class modules referred by child class modules are exported and/or imported. Secondary, group class module is exported and/or imported. Re-usable module engineering data can be exported and imported to the engineering database of other system projects, so that other system project could re-use the engineering data.

Check-Out and/or Check-In

The processes for check-out and/or check-in can be performed per entire group class module including all child class module or modules which belong to the group class module. Namely, each child class module cannot be checked-out and/or checked-in independently. In contrast, as for group application module (group APM), the processes for check-out and/or check-in can be performed per group application module (group APM) alone or in combination with child application modules (child APMs). Namely, each child application module (child APM) can be checked-out and/or checked-in independently.

Contents

As described above, the group class module has design information, attachment list and allocation for the group class module. As also described above, the group application module (group APM) has design information, attachment and allocation. The design information and attachment are separate definitions, and are not updated during instantiation or module update processes. This behavior is the same as that of legacy modules.

Update As described above, if the group class module is modified after instantiation, the modification can be reflected to group application module (group APM) in the following three steps.

1) Update Group APM topologies.
2) Add and/or Delete Child APMs.
3) Update Child APM Contents.

Firstly, a module update manager is launched for the group class module. Then, the topologies and the allocation of the group application module (group APM) are updated by the module update manager. The group application module (group APM) is updated through user's selection and/or by user to trigger, if the group class module is modified). In case that a child class module is deleted by updating the group class module, the corresponding child application module (child APM) is deleted. In this stage, all child application modules (child APMs) must be checked-out and/or checked-in.

Secondary, in case that one or more child class modules are added, the added child class modules are instantiated in an instance list window. If it is necessary to delete one or more child application modules (child APMs), the one or more child application modules (child APMs) are deleted in the application structure navigator.

Finally, legacy class modules referred by child class modules are updated, so that the contents of child application modules (child APMs) are updated.

Ungrouping Group APMs

A user can perform "Ungroup" of group application modules (group APMs). Ungroup refers to an opposite process to the process for grouping. Ungrouping the group application modules (group APMs) will break any loop structures and place each application module directly under a top folder as a project folder in the application structure navigator. After the process for "ungroup", the top folder of the group application modules (group APMs) will become application folders, wherein design information and attachment list directly under the top folder are deleted and child application modules (child APMs) will become class-based application modules (class-based APMs) which refer to respective class modules.

Figure 8:
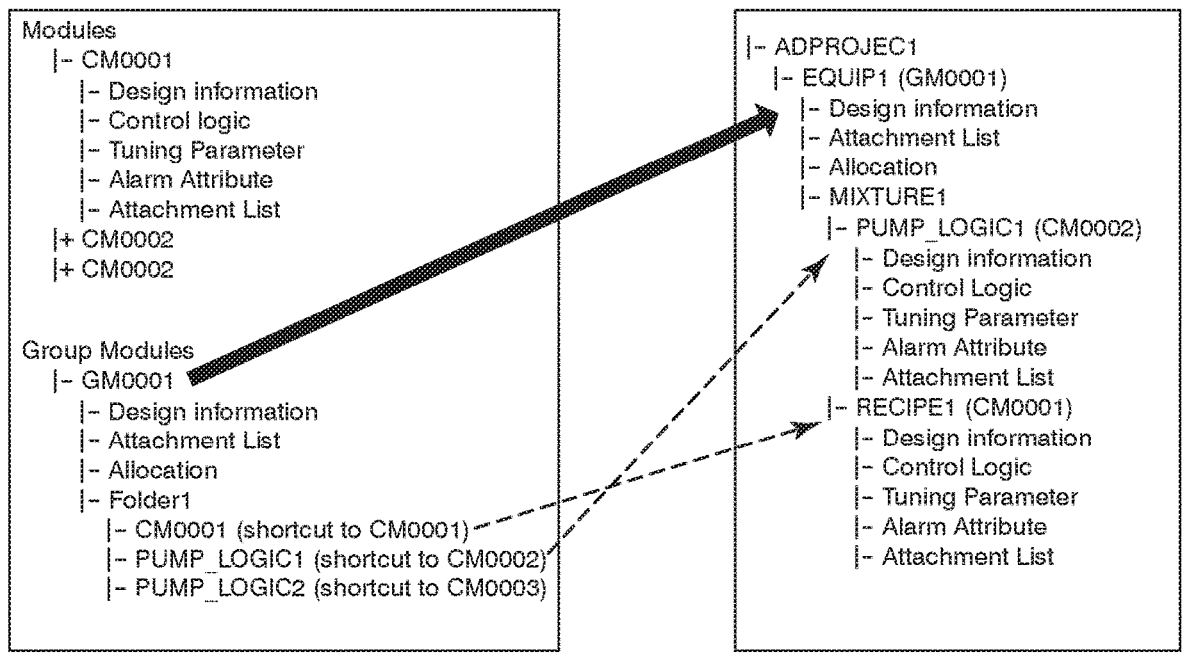
FIG. 8 shows a sample Scenario of module update for group application module (group APM).

FIG. 8 shows a sample Scenario of module update for group application module (group APM). This section describes a concrete example of module update for group APM. FIG. 8 shows an example of group class module GM0001 with Group APM EQUIP1. This group application module (group APM) is partially created with 2 out of 3 of child class modules of Folder 1, i.e. "shortcut to CM0001" and "PUMP_LOGIC 1 (shortcut to CM0002)", which belong to the group class module GM0001. Specifically, "shortcut to CM0001" has been instantiated as child application module "RECIPE 1", and "shortcut to CM0002" has been instantiated as child application module "PUMP_LOGIC 1".

Allocation Settings

The following shows the configuration for its allocation settings from the Group Class Module and Group APM.

| Allocation Settings in Group Class Module | | |
|---|---|---|
| Module | Module Path | Group Number |
| CM0001 | Folder1¥ | 1 |
| PUMP_LOGIC1 | Folder1¥ | 1 |
| PUMP_LOGIC2 | Folder1¥ | 2 |

| Allocation Settings in Group APM | | |
|---|---|---|
| Module | Module Path | Group Number |
| PUMP_LOGIC1 | Folder1¥ | 1 |
| RECIPE1 | Folder1¥ | 1 |

Module Binding

This shows the module binding state of the Group APM which describes that its Group Number 1 is bound to FCS0101→DR0001.

| APM | Group Number | VP Project | FCS | Number |
|---|---|---|---|---|
| EQUIP1 | 1 | VPPJT1 | FCS0101 | 1 |

The following table describes the status of Module Update dialog given the user scenarios and the result of execution of module update.

| | -1 Determining Status of Module Update Dialog and Update Result | | | |
|---|---|---|---|---|
| Scenario | Changes in Group Class Module | Status | Reason | Result of Module Update |
| Adding Child Class | GM0001 has been added with a new class folder | Latest | Changes in GM0001 does not affect the Child APMs in EQUIP1. There is no | |

-1 Determining Status of Module Update Dialog and Update Result

| Scenario | Changes in Group Class Module | Status | Reason | Result of Module Update |
|---|---|---|---|---|
| Folder and/or Child Class Module | "Folder2" | | need to update the Group APM. | |
| | GM0001 has been added with a new class folder "Folder2" and some other Child Class Modules | Latest | Same as above. | |
| | GM0001 has been added with a new class folder "Folder2" and CM0001 is moved under "Folder2". | Obsolete | Structure change is detected since it involved the Child Class Module (CM0001) being referred by RECIPE1. | Child application folder "Folder2" will be created and RECIPE1 will be moved under "Folder2". |
| Deleting Child Class Folder and/or Child Class Module | PUMP_LOGIC1 is deleted. | Obsolete | Child APM PUMP_LOGIC1 is referring to the Child Class Module. | Module update fails because PUMP_LOGIC1 which is assigned in Group Number 1 is bound to DR0001. User must unbind first. |
| | PUMP_LOGIC2 is deleted. | Latest | EQUIP1 has no Child APM referring to PUMP_LOGIC2. | |
| Renaming | GM0001→Folder1 has been renamed to Folder A | Latest | Renaming the class folder is not considered as change in structure. | |
| | MIXTURE1 child application folder is renamed to "MIX_A" | Latest | Renaming the child application folder is not considered as change in structure. | |
| | GM0001 is renamed to A_GM0001 | Latest | This is the same behavior as Class Module and Class based APM. | |
| Module Content change | CM0001 contents has been updated and was check-in. | Latest | Content updates of the source Class Module are out of scope in Group Module Update. These updates can be reflected using the Module Update dialog from Class Module. | |
| | Group Number of PUMP_LOGIC2 is changed | Latest | EQUIP1 has no Child APM referring to PUMP_LOGIC2. | |
| | Group Number is changed. CM0001 = 1 PUMP_LOGIC1 = 2 | Obsolete | Same as above | Module update fails because Group Number 1 is bound to DR0001. User must unbind first. |

In summary, it can be appreciated from the above-described embodiment, one of the most significant functions of the group class module-based engineering for automation design of an industrial plant is improvement in reusability. Reuse of the already tested group class modules can improve engineering quality and reduce engineering time and testing time wherein the already tested group class modules are revised in part and reused in part.

Each element or device for the game apparatus described above can be implemented by hardware with or without software. In some cases, the game apparatus may be implemented by one or more hardware processors and one or more software components wherein the one or more software components are to be executed by the one or more hardware processors to implement each element or device for the game apparatus. In some other cases, the game apparatus may be implemented by a system of circuits or circuitry configured to perform each operation of each element or device for the game apparatus.

The systems and methods in the above-described embodiments may be deployed in part or in whole through a machine or circuitry that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods, devices, apparatus, and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using an object oriented programming language that may be stored, and compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While certain embodiments of the present inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An industrial plant module-based engineering system comprising:
   i) a group module library navigator that contains:
      i-1) a plurality of group class modules, wherein each group class module includes at least one allocation which defines:
         i-1-1) groupings of a plurality of class modules; and
         i-1-2) assignments of the class modules to multiple drawings to define complex loops of multiple logical control module drawings; and
      i-2) a respective plurality of child class modules which belong to an associated group class module of the plurality of group class modules, wherein each child class module includes a respective shortcut file which refers to an associated class module of the plurality of class modules, and wherein the plurality of child class modules defines and forms logic of the complex loops in the associated group class module;
   ii) a group module instantiation engine configured to instantiate the group class module with reflecting a hierarchy of the group class modules to generate, in an application structure navigator, a group application module (group APM) and a hierarchy of the group application module (group APM) from the group class module, and the group module instantiation engine being configured to instantiate the child class module to generate, in the application structure navigator, a child application module (child APM) from the child class module;

iii) a group module update engine configured to update the allocation of each group class module and a respective topology of the complex loops of each group class module, and the group module update engine configured to update an allocation of each group application module (group APM) and a respective topology of the complex loops of each group application module (group APM); and iv) a module binding engine configured to bind, based on the at least one allocation of the group class module, the group application module (group APM) and a legacy application module (legacy APM) to drawings of field controllers in an industrial plant, wherein the legacy application module is at least one of: iv-1) a class-based application module which refers to a source class module: and iv-2) a classless application module which does not refer to any source class module.

2. The industrial plant module-based engineering system according to claim 1, wherein each group class module has a plurality of child class modules, folders, and a hierarchy of the child class modules and the folders.

3. The industrial plant module-based engineering system according to claim 2, wherein each group class module comprises:
a design document information which is used to generate a document of module design;
an attachment which is used to store artifacts related to the class module; and
the allocation which defines groupings of class modules and assignments of the class modules to plural control drawings to define complex loops for drawings of field control systems.

4. The industrial plant module-based engineering system according to claim 3, further comprising:
v) a class module library navigator that contains:
v-1) a respective definition of a class module which includes re-usable module engineering data and documentations,
wherein the re-usable module engineering data include control logics, alarm parameters, and tuning parameters, and
wherein the documentations include design Information and attachments.

5. The industrial plant module-based engineering system according to claim 4, wherein the class module comprises:
a design document information which is used to generate a document of module design;
an attachment which is used to store artifacts related to the class module;
a control logic that contains a logic information of process control;
an alarm attribute; and
turning parameters.

6. The industrial plant module-based engineering system according to claim 1, wherein the group module instantiation engine is configured to allow a user to select part of the child class modules to be not instantiated, to allow the user to generate a set of different group application modules from a single group class module.

7. The industrial plant module-based engineering system according to claim 1, wherein the module binding engine is configured to assign the multiple logical control drawings, which are defined in each group class module, to a respective one of a plurality of physical field control systems.

8. The industrial plant module-based engineering system according to claim 1, wherein the group module update engine is configured further to perform at least one of addition and deletion of a child application module (child APM) which refers to the group application module (group APM) that is instantiated from the group class module, in case that the group module update engine updates the respective topology of the complex loops of the group class module.

9. The industrial plant module-based engineering system according to claim 1, wherein the group module update engine is configured further to update contents of the child application module (child APM) which refers to the group application module (group APM) that is instantiated from the group class module, in case that the group module update engine updates the contents of the child application module (child APM).

10. The industrial plant module-based engineering system according to claim 1, wherein the group module update engine is configured further to perform at least one of addition and deletion of a child application module (child APM) which refers to the group application module (group APM) that is instantiated from the group class module, in case that the group module update engine updates the respective topology of the complex loops of each group application module (group APM).

11. The industrial plant module-based engineering system according to claim 1, wherein the group module update engine is configured further to update the topology of the complex loops of each group application module (group APM), that is instantiated from the group class module, in case that the group module update engine updates the respective topology of the complex loops of each group application module (group APM).

12. The industrial plant module-based engineering system according to claim 1, wherein each group application module (group APM) includes at least one allocation which defines:
i-1-1) groupings of application modules; and
i-1-2) assignments of the application modules to multiple control drawings to define complex loops of multiple logical control drawings.

13. The industrial plant module-based engineering system according to claim 1, wherein the group module update engine is configured to update the allocation of at least one of each group application module (group APM) and the respective topology of the complex loops of each group application module (group APM) if the group module update engine updated the allocation of each group class module and the respective topology of the complex loops of each group class module.

14. The industrial plant module-based engineering system according to claim 1, wherein the group module update engine is configured to update the allocation of at least one of each group application module (group APM) and the respective topology of the complex loops of each group application module (group APM), if the group module update engine performs changes or modifications to the allocation of at least one of each group class module and the respective topology of the complex loops of each group class module.

15. The industrial plant module-based engineering system according to claim 1, wherein the group module update engine is configured to delete the child application module which is instantiated from the child class module that has been deleted by the group module update engine.

16. The industrial plant module-based engineering system according to claim 1, wherein the group module update engine is configured to add an additional child class module, and the group module instantiation engine is configured to instantiate the additional child class module in case that the group module update engine added the additional child class module.

17. The industrial plant module-based engineering system according to claim 1, wherein the group module update engine is configured to delete the child application module from the application structure navigator.

18. The industrial plant module-based engineering system according to claim 1, further comprising:
   vi) an ungrouping editor configured to ungroup the group application module, wherein the ungrouping editor is configured to change a top folder of the group application module into an application folder and to delete design information, attachment list and the allocation of the group application module which are directly under the top folder, and also to change the child application module, which refers to the group application module ungrouped, into the class-based application module.

19. The industrial plant module-based engineering system according to claim 1, wherein the group module instantiation engine comprises implementation to create an applicable instance of the group class module to allow for reusing the group class module as a template group module and allow for configuring editable parameters in the group class module instantiated.

20. The industrial plant module-based engineering system according to claim 19, wherein the group module update engine comprises implementation to update the applicable instance of the group class module created by the group module instantiation engine to allow for reusing the group class module updated and allow for configuring editable parameters in the group class module updated.

21. The industrial plant module-based engineering system according to claim 1, wherein the allocation of the group application module (group APM) includes a subset from the allocation of the group class module from which the group application module (group APM) was instantiated.

22. An industrial plant module-based engineering method comprising:
   preparing, in a group module library navigator:
      i-1) a plurality of group class modules, wherein each group class module includes at least one allocation which defines:
         i-1-1) groupings of class modules; and
         i-1-2) assignments of the class modules to multiple control drawings to define complex loops of multiple logical control drawings; and
      i-2) a plurality of child class modules, wherein each child class module includes a respective shortcut file to an associated group class module of the plurality of class modules to which each child class module refers, and wherein each shortcut file defines and forms logic of the complex loops in the associated group class module;
   ii) instantiating the group class module with reflecting a hierarchy of the group class modules to generate, in an application structure navigator, a group application module (group APM) and a hierarchy of the group application module (group APM) from the group class module, to allow a user to reuse the group class module as a template group module and allow for configuring editable parameters in the group class module instantiated; and
   iii) instantiating the child class module to generate, in the application structure navigator, a child application module (child APM) from the child class module to allow for reusing the group class module instantiated and allow for configuring editable parameters in the group class module instantiated.

23. The industrial plant module-based engineering method according to claim 21, further comprising:
   iv) updating the allocation of each group class module and a respective topology of the complex loops of each group class module; and
   v) updating an allocation of each group application module (group APM) and a respective topology of the complex loops of each group application module (group APM).

24. The industrial plant module-based engineering method according to claim 21, further comprising:
   binding, based on the at least one allocation of the group class module, the group application module (group APM) and a legacy application module (legacy APM) to drawings of field controllers in an industrial plant, wherein the legacy application module is at least one of:
      iv-1) a class-based application module which refers to a source class module: and iv-2) a classless application module which does not refer to any source class module.

* * * * *